(12) United States Patent
Meisser et al.

(10) Patent No.: US 6,362,492 B1
(45) Date of Patent: Mar. 26, 2002

(54) METHOD AND DEVICE FOR DETECTING EDGE STRUCTURES

(75) Inventors: Claudio Meisser, Cham; Tony Egli, Hochdorf; Hilmar Ehlert, Luzern, all of (CH)

(73) Assignee: Komax Holding AG, Dierikon (CH)

( * ) Notice: Subject to any disclaimer, the term of this patent is extended or adjusted under 35 U.S.C. 154(b) by 0 days.

(21) Appl. No.: 09/450,144

(22) Filed: Nov. 29, 1999

(51) Int. Cl.$^7$ ............................................... G01N 21/86
(52) U.S. Cl. .................... 250/559.36; 250/559.4
(58) Field of Search ...................... 250/559.36, 559.33, 250/559.4, 341.8, 461.2; 356/39, 40, 41, 73, 244; 128/664–665

(56) References Cited

U.S. PATENT DOCUMENTS 6,181,802 B1 * 1/2001 Todd ........................ 382/100

FOREIGN PATENT DOCUMENTS

| EP | 196 514 | 10/1986 |
| EP | 338 446 | 10/1989 |
| FR | 2 455 264 | 11/1980 |
| GB | 2 268 268 | 1/1994 |
| JP | 61 133 844 | 6/1986 |

* cited by examiner

Primary Examiner—Que T. Le
(74) Attorney, Agent, or Firm—Cohen, Pontani, Lieberman & Pavane

(57) ABSTRACT

A cable to be tested includes an electric conductor and insulation. A sleeve is fitted on the insulation. The exposed cable end is prepared for a crimped connection, the electric conductor being connected of a conductor crimp, and the insulation and the sleeve being connected by an insulation crimp to a contact. The dimensions of the conductor crimp zone and the insulation crimp zone of the contact determine the spacing of the insulation end from the conductor end, and the spacing of the sleeve end from the insulation end. To test the sleeve position, the cable is moved over a diaphragm, the diaphragm being more or less covered depending on the instantaneous edge structure of the cable, and the light quantity transiting the diaphragm varying depending on the edge structure of the cable. The edge structures of the cable can be determined from the transiting light quantity.

9 Claims, 4 Drawing Sheets

METHOD AND DEVICE FOR DETECTING EDGE STRUCTURES

BACKGROUND OF THE INVENTION

1. Field of the Invention

The invention relates to a method and a device for contactless detection of edge structures of a test specimen, it being possible for the light quantity, which can be varied by means of the test specimen, of a light source to be measured and for the edge structures of the test specimen to be represented on the basis of the measurement of light quantity.

2. Discussion of the Prior Art

A device for detecting semiconductor housing, for example, is known from European reference EP 0 196 514. The edges of the semiconductor housings are projected by means of a microscope onto an image matrix of a CCD image converter. The CCD image converter converts the image focused onto its image matrix into individual electric charges which are then read out in rows and digitized in the fashion of pixels. The brightness values of the pixels are stored by row and column and conditioned to form space coordinates of the edges to be found.

A disadvantage of the known device resides in that the device, operating on the principle of image processing for detecting simple structures such as, for example, edges is very complicated, and therefore expensive. Moreover, this device is sensitive to extraneous light.

It is an object of the invention to provide a remedy to this problem. The invention achieves the object of avoiding the disadvantages of the known device, and of using simple means to create a device for detecting simple edge structures.

One aspect of the present invention resides in a method for contactless detection of edge structures of a test specimen, which method includes the steps of arranging a light source opposite a diaphragm, moving the test specimen over the diaphragm to vary a quantity of light transiting the diaphragm from the light source, measuring the varying light quantity which depends on the edge structure of the test specimen, and determining the edge structures of the test specimen from the transiting light quantity. Another aspect of the invention resides in a device for detecting edge structures of the specimen, which device includes a light source, means for detecting a light quantity of the light source, which light quantity can be varied by the test specimen, means for evaluating the variable light quantity, and a diaphragm arranged between the light source and the evaluating means so that the light quantity is fed to the evaluating means.

The advantages achieved by means of the invention are to be seen essentially in the fact that the detection of the edge structures is simplified. The bodies with the structures to be detected can be moved through the measuring zone with the aid of a simple, automated movement, the edge structures being detected during the movement. Due to the simple design of the measuring device and to the simple measuring method, the automatic system required and serving the purpose of automatic production can be of simple design. The serial production of the bodies with the edge structures (specimens) to be detected can be improved in terms of quality and production with the aid of the proposed device. Furthermore, the proposed measuring device is cost-effective and independent of extraneous light, and has an accuracy comparable with a device operating on the principle of image processing.

The invention is explained in more detail below with the aid of drawings representing an exemplary embodiment.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
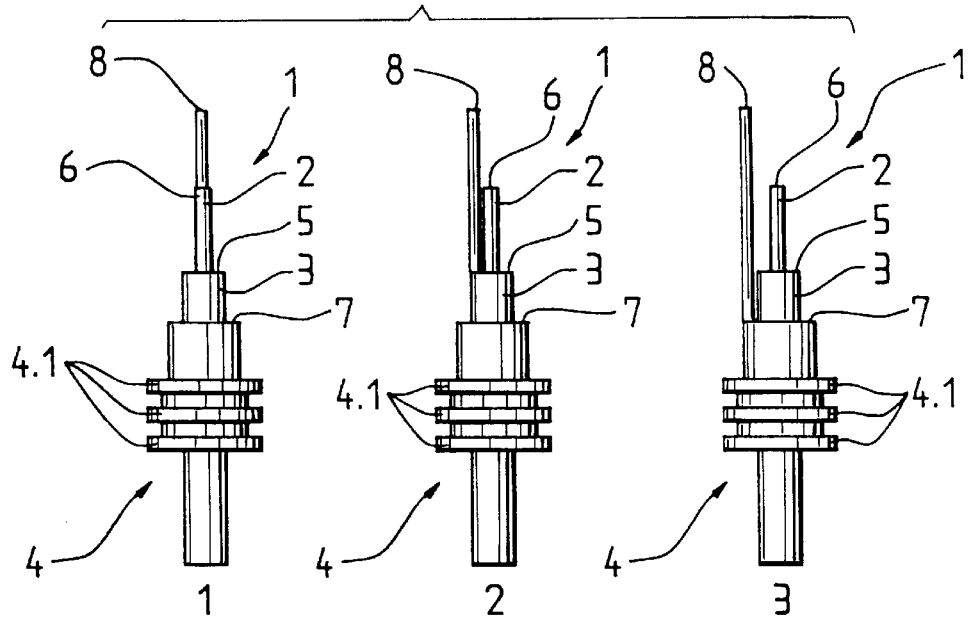
FIG. 1 shows a test specimen moving over a diaphragm.

A test specimen, for example an electric cable, is denoted by 1 in FIGS. 1 to 6. The cable 1 comprises an electric conductor 2 and an insulation 3. A sleeve 4 is fitted on the insulation 3. The cable end shown is prepared for a crimped connection, in which a contact (not represented) is connected to the cable 1, the electric conductor 2 being connected to the contact by means of a conductor crimp, and the insulation 3 and a sleeve 4 being connected to the contact by means of an insulation crimp. The conductor crimp ensures the electric connection of the conductor to the contact, and the insulation crimp serves to relieve the strain of the cable 1 with respect to the conductor 2. The dimensions of the conductor crimp zone and the insulation crimp zone of the contact determine the spacing of the insulation end 5 from the conductor end 6, and the spacing of the sleeve end 7 from the insulation end 5. As a rule, the insulation 3 and the sleeve 4 are connected jointly to the contact in the insulation crimp zone. The sleeve 4 shown has ribs 4.1 which serve to seal a cable entry fitting into a housing.

Figure 2:
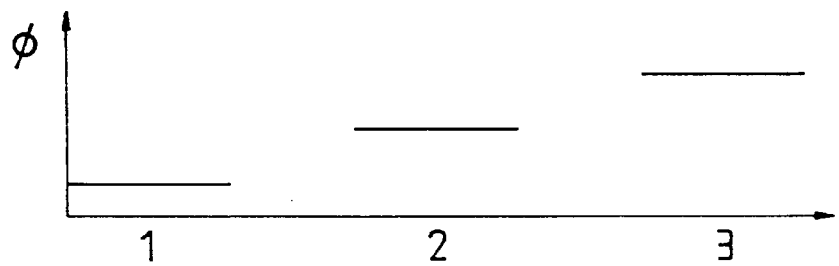
FIG. 2 shows a light quantity transiting the diaphragm, as a function of the edge structure of the test specimen.

As shown in FIG. 1, the test specimen 1 is moved over a diaphragm 8, the diaphragm 8 being more or less covered depending on the instantaneous edge structure of the test specimen 1. The diaphragm width is dimensioned such that the diaphragm 8 is completely covered in width by the conductor 2. The conductor width is, for example, a multiple of the diaphragm width. The ratio of the conductor width to the diaphragm width is of subordinate importance, because the light quantity $\phi$ transiting the diaphragm 8 is measured. FIG. 2 shows the light quantity $\phi$ transiting the diaphragm 8 for the positions 1, 2 and 3 of the test specimen 1 over the diaphragm 8.

Figure 3:
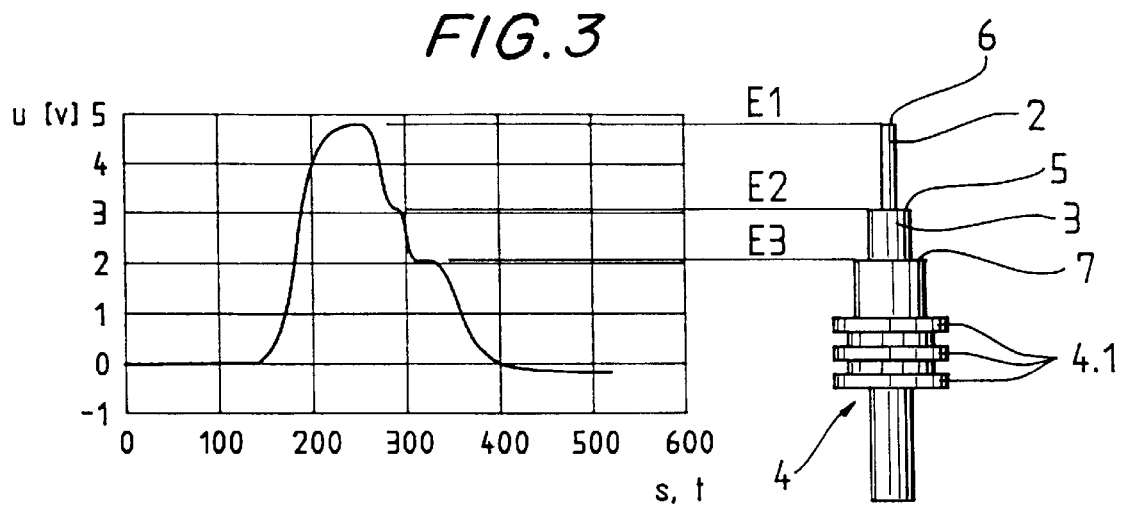
FIG. 3 shows an electrical signal corresponding to the transiting light quantity.

If the test specimen 1 is now moved continuously over the diaphragm 8, the light quantity $\phi$ transiting the diaphragm 8 also changes continuously in accordance with the edge structure of the test specimen 1. As represented in FIG. 3, the changing light quantity $\phi$ can be converted into an electric signal U, a distance s or a time t being plotted on the abscissa. The cable 1 with the fitted sleeve 4 has two edge structures which are symmetrical relative to the cable longitudinal axis. When the cable 1 is moved over the diaphragm 8, a symmetrical curve of the light quantity φ, or a symmetrical curve of electric signal U is produced. In the example of FIG. 3, the cable 1 is moved in a slightly oblique fashion relative to the diaphragm, as a result of which one half of the curve becomes more indicative with reference to the conductor end 6, insulation end 5 and sleeve end 7. On one half, the signal U has unique planes E1, E2, E3 which correspond to the conductor end 6, the insulation end 5 and the sleeve end 7, respectively. The position of the planes E1, E2, E3 can be used to determine the spacing of the insulation end 5 from the conductor end 6, and the spacing of the sleeve end 7 from the insulation end 5.

Figure 3A:
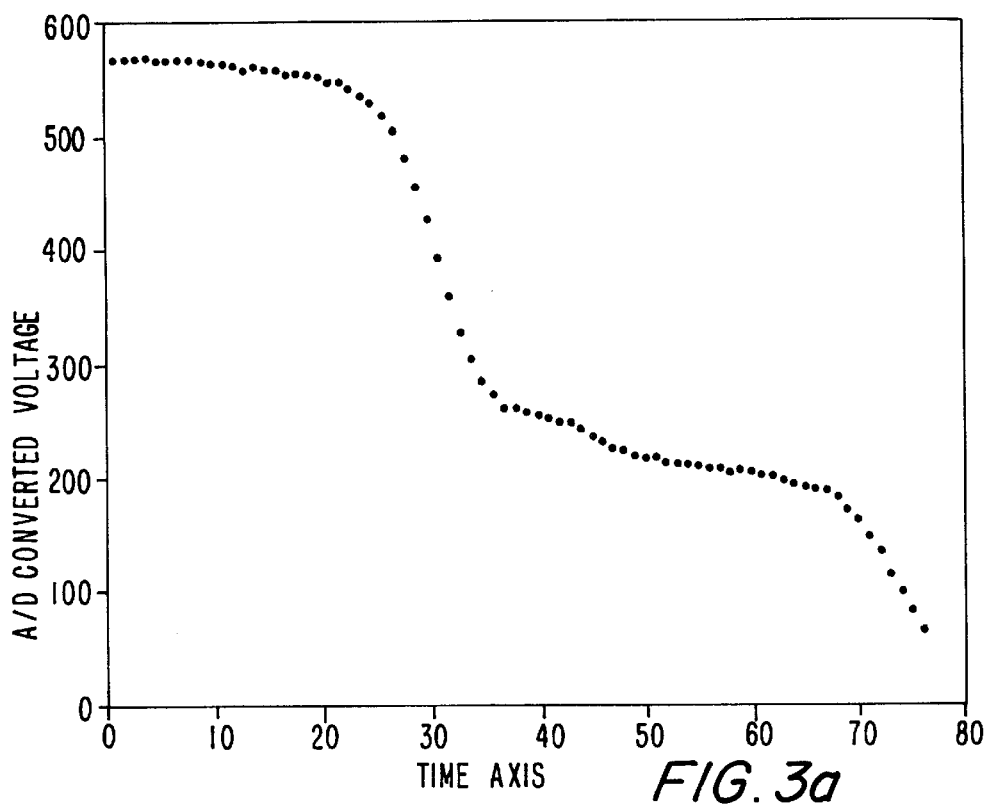
FIG. 3a shows an electric signal converted into digital values.

As represented in FIG. 3a, the analog signal U is converted into digital values in order to determine the planes E1, E2, E3. FIG. 3a shows a section of FIG. 3, the section showing the region of the plane E3, for example. A point signifies a specific voltage in digital form at a specific time.

Figure 4:
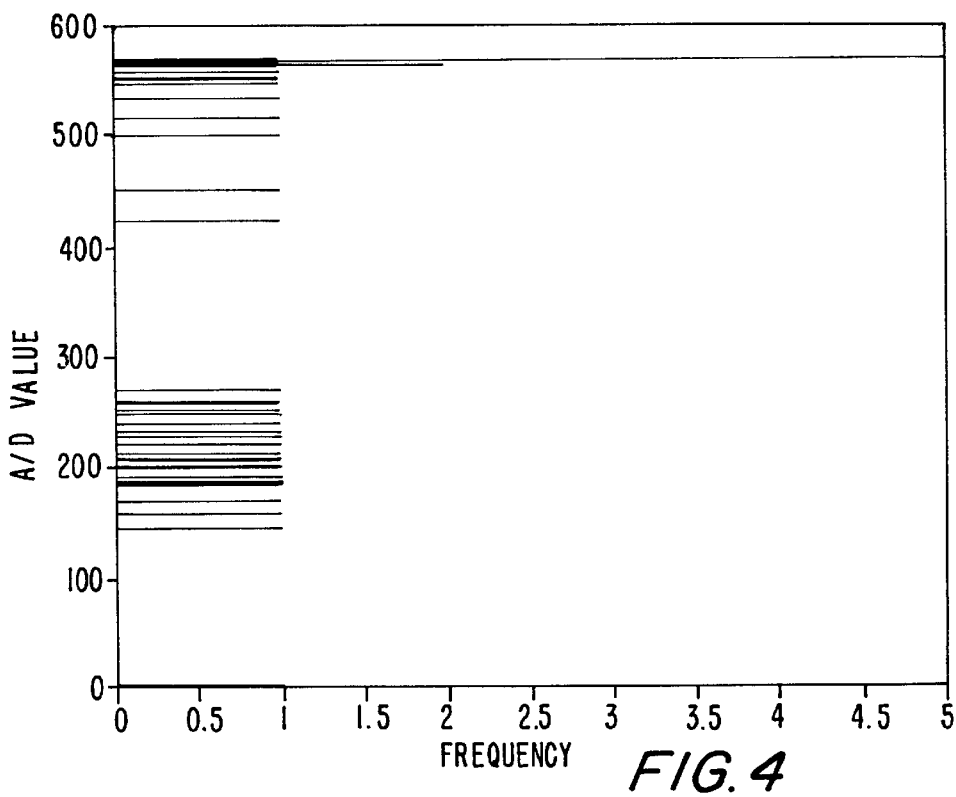
FIG. 4 shows a histogram calculated from the electric signal.
Figure 5:
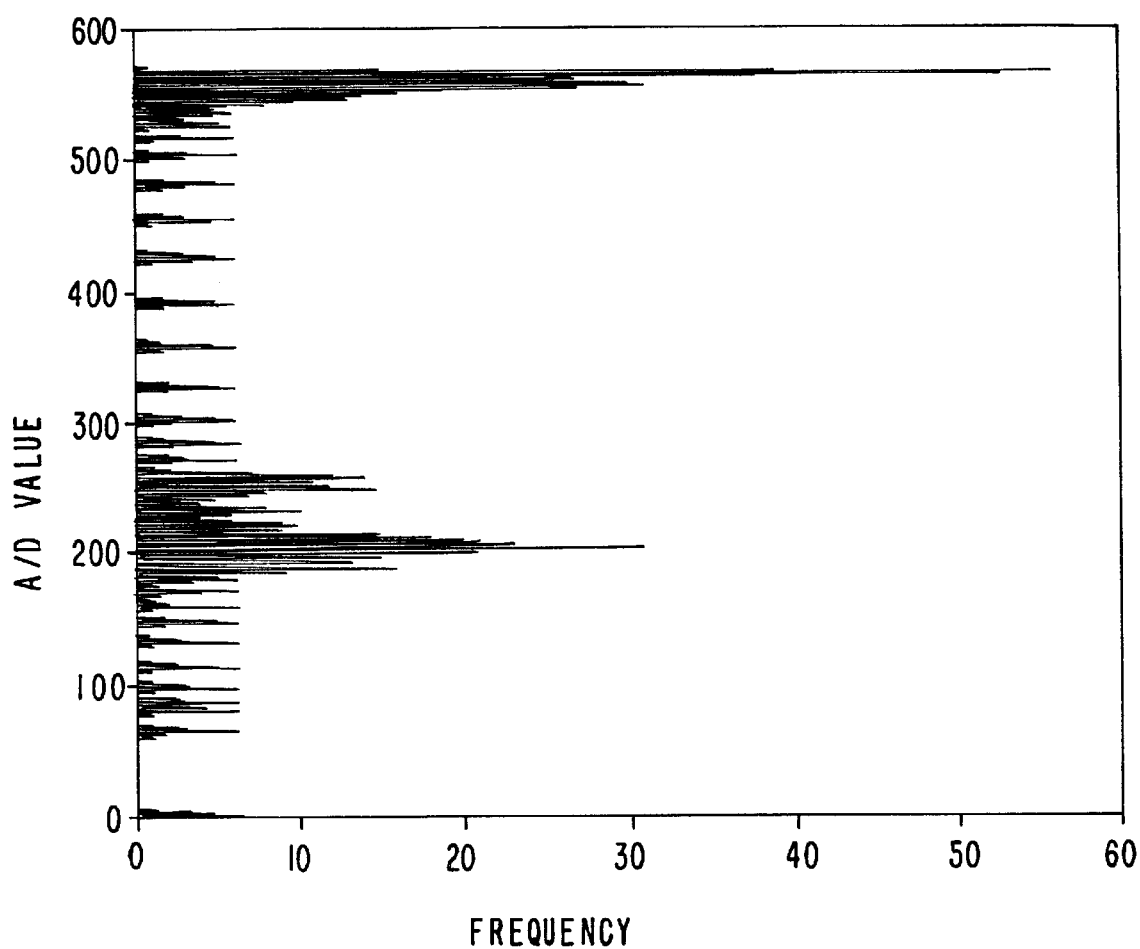
FIG. 5 shows a weighted histogram for determining the edge structure of the test specimen.

The histogram shown in FIG. 4 is a statistical representation of the measured values in accordance with FIG. 3a. The histogram specifies which measured value in digital form occurs how often in the signal to be analyzed. For example, the digital value 100 does not occur, whereas many values in the range of between 200 and 300 or between 500 and 600 occur with the frequency 1, or once. However, the positions of the planes E1, E2, E3 cannot be uniquely determined from the concentration of the values, because only a limited number of measured values are available per detection of the edge structures. For this reason, a weighted histogram which includes the immediate vicinity of the measured values in the calculation is determined in accordance with FIG. 5. The weighting, serving the purpose of avoiding errors, can be performed in accordance with the following relationship, for example:

weighted histogram value (j)=

$$\text{weighted histogram value}(j) = \sum_{i=-b}^{+b} \text{histogram values}(j+i) * \text{factor}(l)$$

in which
j is the position on the ordinate at which the weighted value is calculated,
factor (l) is a weighting vector consisting of 2*b+1 elements,
i is a running variable in the range of −b to +b, and
b is a number of values (samples) around j,
5 values being taken into account on either side of j, for example.

After the determination of the weighted histogram, the maxima and their mutual spacings are determined, and the latter are, in turn, a measure of the conductor end 6, the insulation end 5 and the sleeve end 7, respectively.

Figure 6:
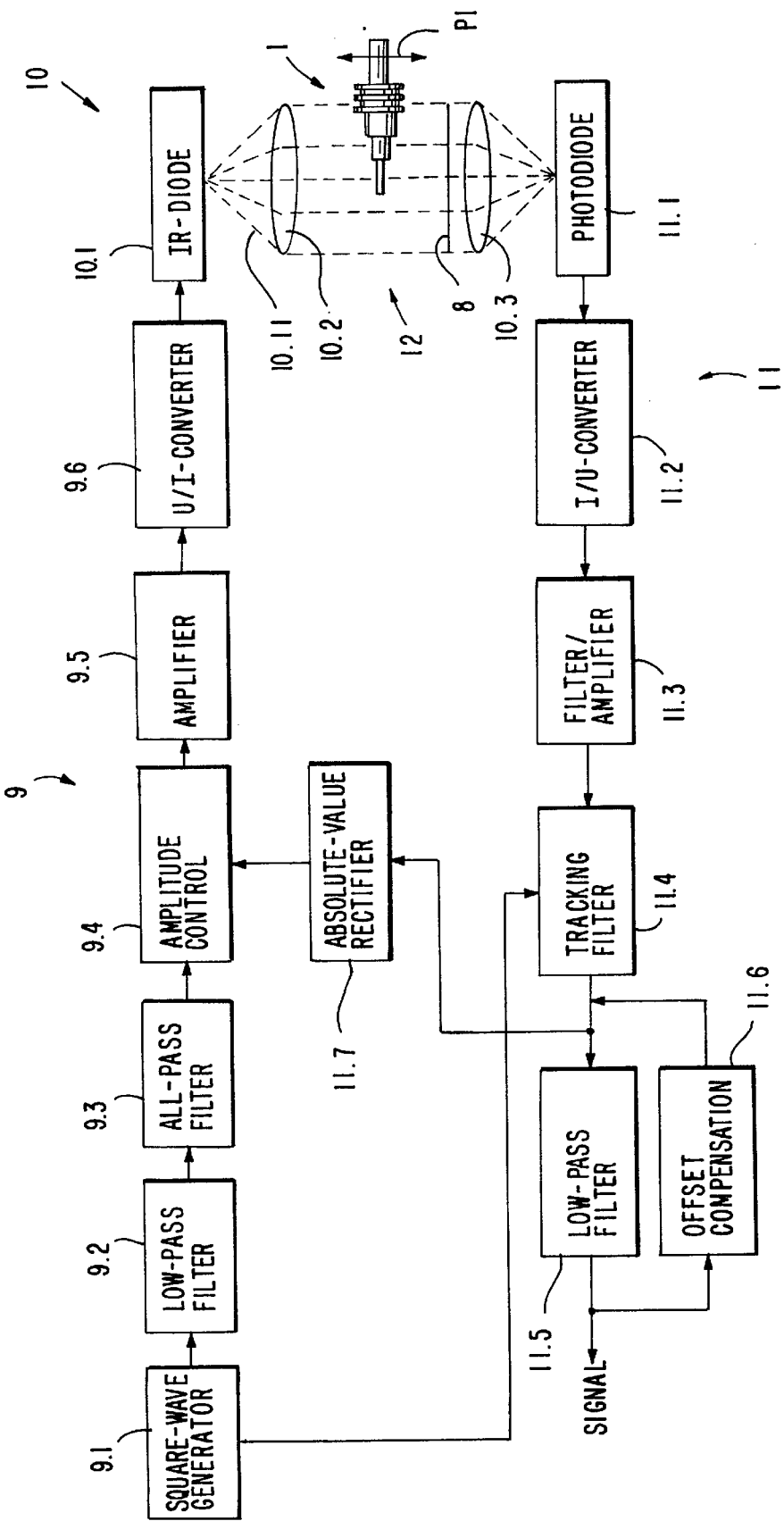
FIG. 6 shows a device for generating for electric signal.

FIG. 6 shows a device for generating the signal U which comprises a transmitting part 9, an optical part 10 and a receiving part 11. In the transmitting part 9, a generator 9.1 generates a square-wave signal at, for example, 100 kHz. A low-pass filter 9.2 filters from the square-wave signal a sinusoidal fundamental which serves as a carrier frequency. The phase angle of the signal is adjusted by means of an all pass filter. The sinusoidal signal is combined multiplicatively with the manipulated variable of an amplitude controller 9.4 and subsequently amplified in a first amplifier 9.5. The adapted sinusoidal signal is converted by means of a U/I converter 9.6 into a proportional diode current which is fed to an IR diode 10.1 of the optical part 10. The IR diode 10.1 serves as a punctiform infrared light source whose beam path 10.11 is directed by means of a lens 10.2 to be parallel to a Fresnel lens, for example. There follows subsequently a measuring zone 12 which the test specimen 1 traverses. The parallel beam path 10.11 is led over the diaphragm 8 and a positive lens 10.3 onto a photodiode 11.1 of the receiving part 11. Because the beam path is parallel between the lenses 10.2 and 10.3, the detection of the edge structures is independent of a displacement P1 of the test specimen 1 along the parallel beam path 10.11.

The photodiode 11.1 converts the light quantity φ occurring on the other side of the diaphragm 8 into a current which is converted into a voltage in the downstream I/U converter 11.2. The voltage signal is fed by means of an amplifier 11.3 to a tracking filter 11.4 which operates as a synchronous demodulator and removes the sinusoidal fundamental serving as carrier frequency. Subsequently, the signal is conditioned to form the signal U by means of a lowpass filter 11.5 and an offset compensator 11.6. The influences of extraneous light which are present in the signal of the photodiode 11.1 are reduced to a level which no longer has an interfering effect by using a carrier frequency and a synchronous modulation.

The amplitude controller 9.4 uses the non-conditioned signal as an actual value. Said signal is rectified by means of a rectifier 11.7, and is the manipulated variable of the amplitude controller 9.4, designed as a P1 controller, the output signal controlling the amplitude and the sinusoidal fundamental, and thereby the transmitting power of the IR diode 10.1. The temperature-induced parameter changes in the individual electronic components are reduced with the aid of the amplitude control.

The invention is not limited by the embodiments described above which are presented as examples only but can be modified in various ways within the scope of protection defined by the appended patent claims.

We claim:

1. A method for contactless detection of edge structures of a test specimen, comprising the steps of:
    arranging a light source opposite a diaphragm;
    moving the test specimen over the diaphragm to vary a quantity of light transiting the diaphragm from the light source;
    measuring the varying light quantity which depends on the edge structure of the test specimen; and
    determining the edge structures of the test specimen from the transiting light quantity.

2. A method as defined in claim 1, including converting the varying light quantity into a digitized electric signal, and statistically evaluating the digitized signal.

3. A method as defined in claim 2, wherein the determining step includes determining the edge structures of the test specimen by the statistical evaluation.

4. A device for detecting edge structures of a test specimen, comprising:
    a light source;
    means for detecting a light quantity, which can be varied by the test specimen, of the light source;
    means for evaluating the variable light quantity, the edge structures being determined by the means for evaluating the variable light quantity; and
    a diaphragm arranged between the light source and the evaluating means so that the light quantity, which can be varied by the test specimen, is fed to the means for evaluating the variable light quantity.

5. A device as defined in claim 4, wherein the light source and the diaphragm are combined in an optical part, and further comprising transmitting means for feeding the optical part, the means for evaluating the variable light quantity including a receiving part.

6. A device as defined in claim 5, wherein the transmitting means includes a generator for generating a carrier frequency, and an amplitude controller for modulating the carrier frequency amplitude, the modulated carrier frequency feeding the light source of the optical part.

7. A device as defined in claim 6, wherein the receiving part includes a photodiode, the optical part having an IR diode as the punctiform light source, the optical part further including a lens configured and arranged to generate a parallel beam path whose light quantity can be varied by the test specimen, and a positive lens, so that the beam path is feedable in a punctiform fashion through the diaphragm and via the positive lens to the photodiode which converts the incident light quantity into an electric signal.

8. A device as defined in claim 7, wherein the receiving part includes a synchronous demodulator which removes the carrier frequency from the signal of the photodiode.

9. A device as defined in claim 8, wherein the amplitude controller is connected to an output of the synchronous demodulator, the synchronous demodulator producing an output that serves as an actual value of the amplitude controller.

* * * * *